United States Patent [19]

Joshi et al.

[11] Patent Number: 4,785,469
[45] Date of Patent: Nov. 15, 1988

[54] PROCESSOR TO PERIPHERAL INTERFACE FOR ASYNCHRONOUS OR SYNCHRONOUS APPLICATIONS

[75] Inventors: Sunil Joshi, Campbell; Venkatraman Iyer, Berkeley, both of Calif.

[73] Assignee: Advanced Micro Devices, Inc., Sunnyvale, Calif.

[21] Appl. No.: 13,845

[22] Filed: Feb. 12, 1987

[51] Int. Cl.[4] ............................................... H04L 7/02
[52] U.S. Cl. ......................................... 375/110; 375/8; 375/114
[58] Field of Search ............... 375/7, 8, 106, 110, 375/114; 364/188; 379/93

[56] References Cited

U.S. PATENT DOCUMENTS

| Re. 31,319 | 7/1983 | Fraser | 364/250 X |
|---|---|---|---|
| 4,093,823 | 6/1978 | Chu | 371/33 X |
| 4,384,307 | 5/1983 | Kuzmik et al. | 364/514 X |
| 4,581,483 | 4/1986 | Ralston | 178/18 |
| 4,656,643 | 4/1987 | Geneste et al. | 375/7 X |
| 4,700,358 | 10/1987 | Duncanson et al. | 378/8 |

OTHER PUBLICATIONS

AM9517A Multimode DMA Controller, Jun. 1982.

Primary Examiner—A. D. Pellinen
Assistant Examiner—Derek S. Jennings
Attorney, Agent, or Firm—Ronald C. Fish

[57] ABSTRACT

There is disclosed herein an interface for a peripheral to allow the peripheral to communicate with either synchronous or asynchronous systems. The interface includes a series of flip-flops coupled in a chain to take the combined data strobe and chip select signals from an asynchronous system such as a microprocessor and synchronize the combined signal with the peripheral clock and convert the signal to a pulse. This pulse then emulates the instruction enable pulse received from synchronous microprogrammed systems. If the peripheral is operating in a synchronous sytem, the instruction enable signal from the system is gated through a multiplexer controlled by a mode signal which indicates which mode is active so as to act as the peripheral instruction enable signal. An AND gate gates one bit of the instruction bus with the ANDed chip select and data strobe signals to create a read/write control signal for internal use in controlling the data bus drivers.

8 Claims, 6 Drawing Sheets

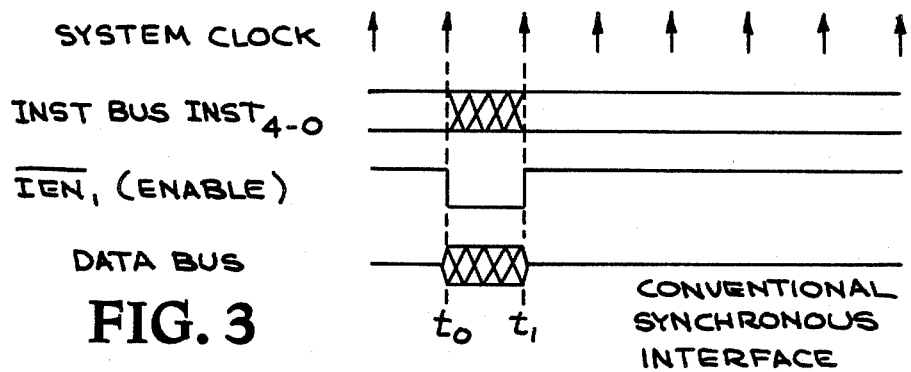
FIG. 3    CONVENTIONAL SYNCHRONOUS INTERFACE
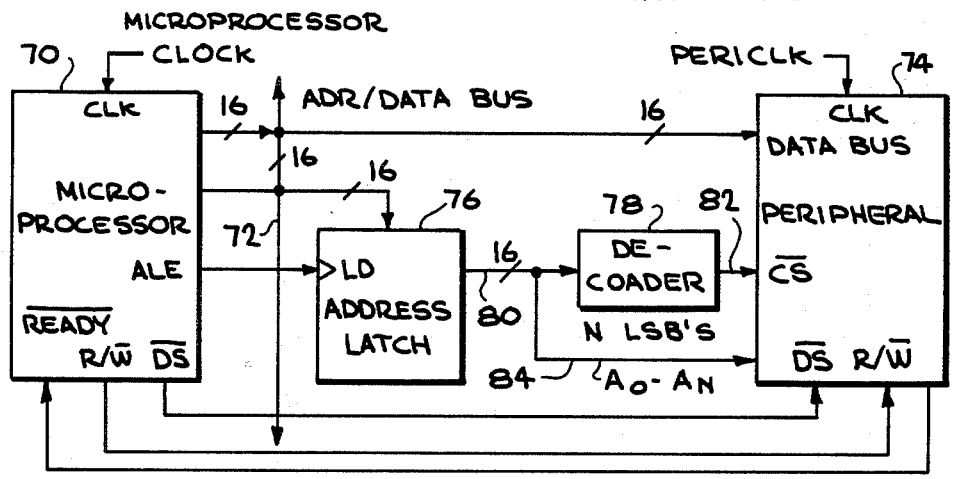
FIG. 4
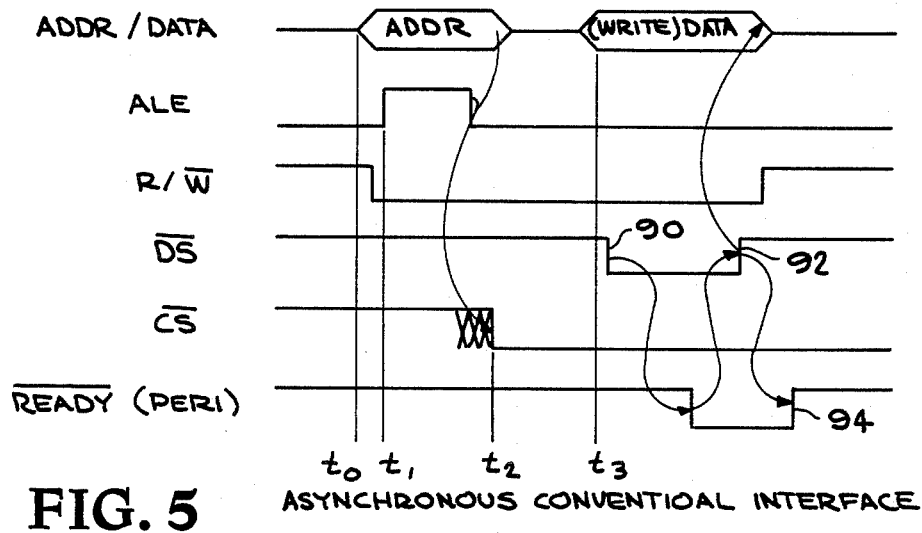
FIG. 5    ASYNCHRONOUS CONVENTIONAL INTERFACE

READ AND WRITE CYCLE TIMING WITH A
MICROPROGRAMMED PROCESSOR
B MODE = 1

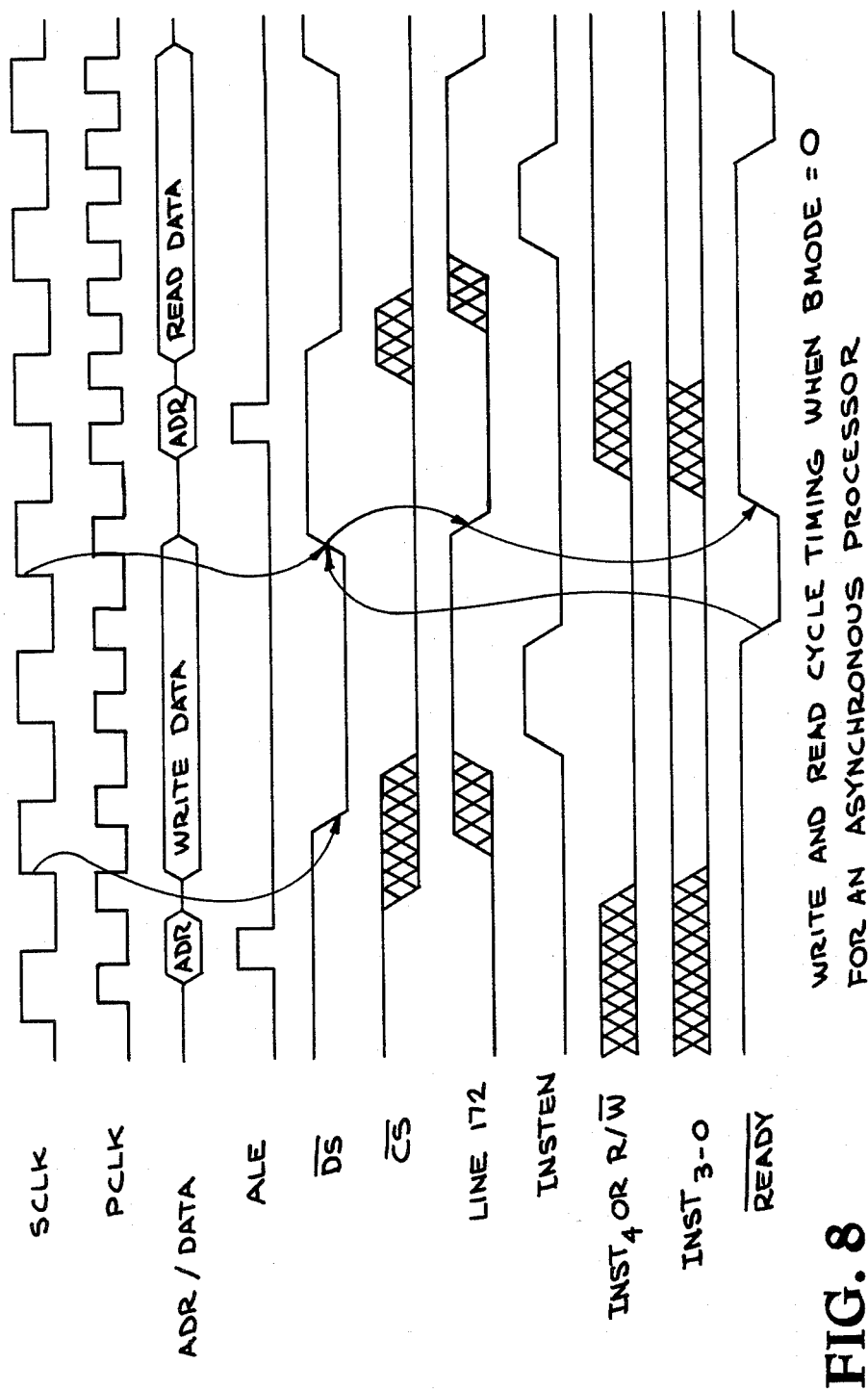
FIG. 8 WRITE AND READ CYCLE TIMING WHEN BMODE = 0 FOR AN ASYNCHRONOUS PROCESSOR

PROCESSOR TO PERIPHERAL INTERFACE FOR ASYNCHRONOUS OR SYNCHRONOUS APPLICATIONS

BACKGROUND OF THE INVENTION

The invention relates to the field of interfaces between processors and peripherals. More specifically, the invention relates to the field of processor to peripheral interfaces for processors which are either synchronous or asynchronous.

There are many applications today where microprocessors running various control programs are coupled to peripheral chips which are used by the microprocessor to do various functions necessary for the application. An example would be a UART for transmitting and receiving data over buses or a data path controller for a local area network application. Many other examples of peripherals exist, and new types of peripherals will be continuously developed. In these microprocessor applications, the peripherals have their own clocks which are asynchronous to the microprocessor clock. Typically, the microprocessor sends commands and data to the peripheral device and reads data from the peripheral device. Special interface circuitry is necessary to insure that these read and write transactions occur properly given that the two devices are running on different clocks. Because of this aspect and the fact that multiple peripherals may be connected to the same data bus, there exists a need for a predetermined set of handshaking signals to indicate to a peripheral when it is being addressed, what kind of a transaction is supposed to occur, when the peripheral is ready, and when the data is on the bus.

Other applications use bit sliced microprocessors or microprogrammed architecture coupled to peripherals all of which run on the same system clock. In these architectures, the controller sends instructions to the peripheral on an instruction bus and sends an instruction enable signal to the peripheral to enable decoding of the instruction. The peripheral is also coupled to the system data bus which is also coupled to the ALU of the microprogrammed system. In these systems, the peripherals must have a special interface to decode the instructions, tri state the data bus and enable the proper register or other logic in the peripheral that the controller wishes to read from or write to.

Heretofore, the interfaces needed by the peripherals in each of these two types of systems needed to be different because of the different handshaking signals involved to synchronize the transfer of data because of the different situations with respect to the clock and the different transaction methods in the two cases. The two types of systems often use the same types of peripherals. Manufacturers of peripherals therefore must manufacture two different types of peripherals which do the same function but which have different interfaces. This causes extra expense.

Thus there has arisen a need for a universal interface which may be used in both asynchronous and synchronous applications.

SUMMARY OF THE INVENTION

According to the teachings of the invention, there is provided a universal interface apparatus and method of information exchange suitable for both synchronous and asynchronous applications. The interface according to the teachings of the invention includes circuitry for performing a logical AND operation and synchronizing a data strobe signal and a chip select signal from an asynchronous system and converting the combined signal into an instruction enable signal when another signal called BMODE is in a first state indicating the interface is with an asynchronous processor. For interfaces with synchronous processors, the circuitry according to the teachings of the invention gates the instruction enable signal from the processor as the internal instruction enable signal of the peripheral when the BMODE signal indicates a synchronous processor is connected. The circuitry also includes gates to gate one signal on the instruction bus from the processor with the combined data strobe and the chip select signal to act as the read/write signal of the peripheral for either asynchronous or synchronous processors.

BRIEF DESCRIPTION OF THE DRAWINGS

FIG. 3 is a timing diagram of a typical data exchange operation in the system of FIG. 1.

FIG. 4 is a logic diagram of a typical asynchronous processor-peripheral interface.

FIG. 5 is a timing diagram of a typical data exchange in the system of FIG. 4.

FIG. 8 is a timing diagram for read and write cycle timing for transactions with an asynchronous processor.

DETAILED DESCRIPTION OF THE PREFERRED EMBODIMENT

Figure 1:
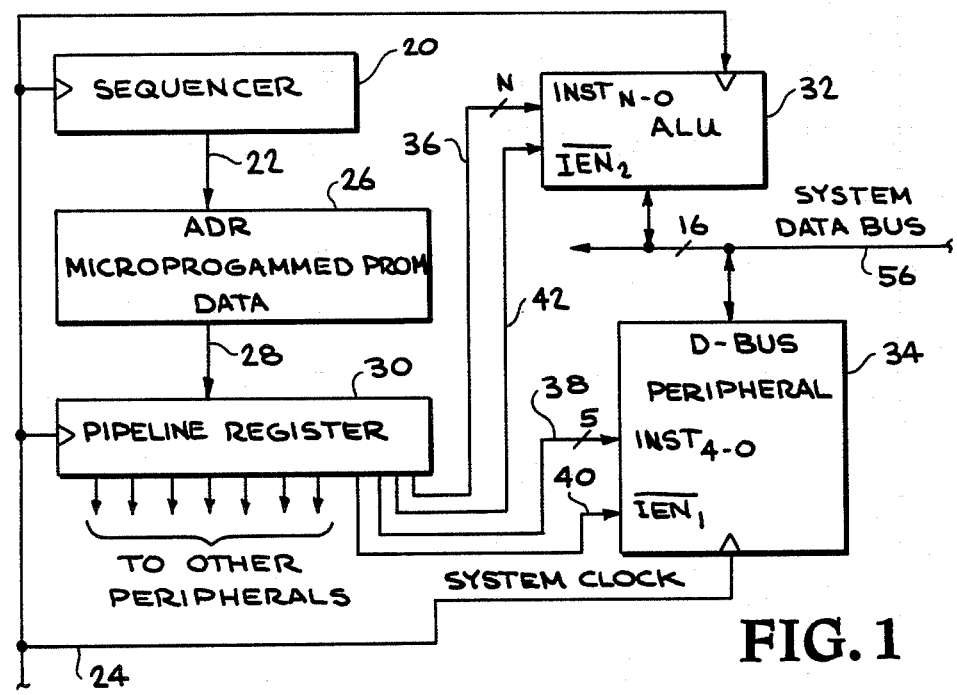
FIG. 1 is a logic diagram of a typical microprogrammed, synchronous processor-peripheral system.

FIG. 1 shows a block diagram of a typical synchronous architecture in the form of a microprogrammed system. A sequencer 20 generates addresses on a bus 22 in response to clock signals on the system clock bus 24. These addresses are sent to a microprogrammed PROM or ROM 26 where they cause access of a particular microcode word stored at that address in the PROM 26. Typically, the microcode word is one word in a sequence of microcode words which together comprise a control program which causes the system to perform the function desired by the user.

The control word emerges from the PROM 26 on a data bus 28 and is clocked for storage into a pipeline register 30. The control word is comprised of a plurality of fields, each field being a control signal or instruction field for one of the peripherals in the system. In the system of FIG. 1, only two peripherals are shown, an ALU 32 and a generic peripheral 34. Each peripheral receives its instructions from the register 30 via an instruction bus dedicated to that peripheral and carrying a plurality of control bits derived from some field in the control word stored in the register 30. In the case of the ALU 32, the instruction bus 36 carries an N bit instruction word having the same binary code as the N bits of the ALU instruction field in the control word stored in the register 30. Likewise, the peripheral 34 receives a 5 bits (typically 5 bits but the instruction word could have other numbers of bits as well) on an instruction bus 38.

The instruction word tells the peripheral whether the transaction desired by the controller is a read or write and which register in the peripheral is to be written to or which register is to put its data onto the system data bus. Typically, the microcode word will control a number of peripherals simultaneously. When a transfer is to occur, it will be between two different peripherals and these two peripherals will be addressed. One peripheral will instructed to place the contents of one its registers on the system data bus and another peripheral will be instructed to take the data on the data bus and store it in one of its registers.

Another bit of the register 30 will be used for each peripheral to implement the instruction enable signal IEN* (an * following a signal name indicates an active low signal indicated by an overscore on the drawings). The instruction enable signal is a signal which tells the peripheral that the instruction on the instruction bus for that peripheral is to be decoded and carried out, i.e., that the peripheral is being addressed. In the case of the peripheral 34, the instruction enable signal is the signal IEN1* on the line 40. In the case of the ALU peripheral 32, the instruction enable signal is the signal IEN2* on the line 42.

Figure 2:
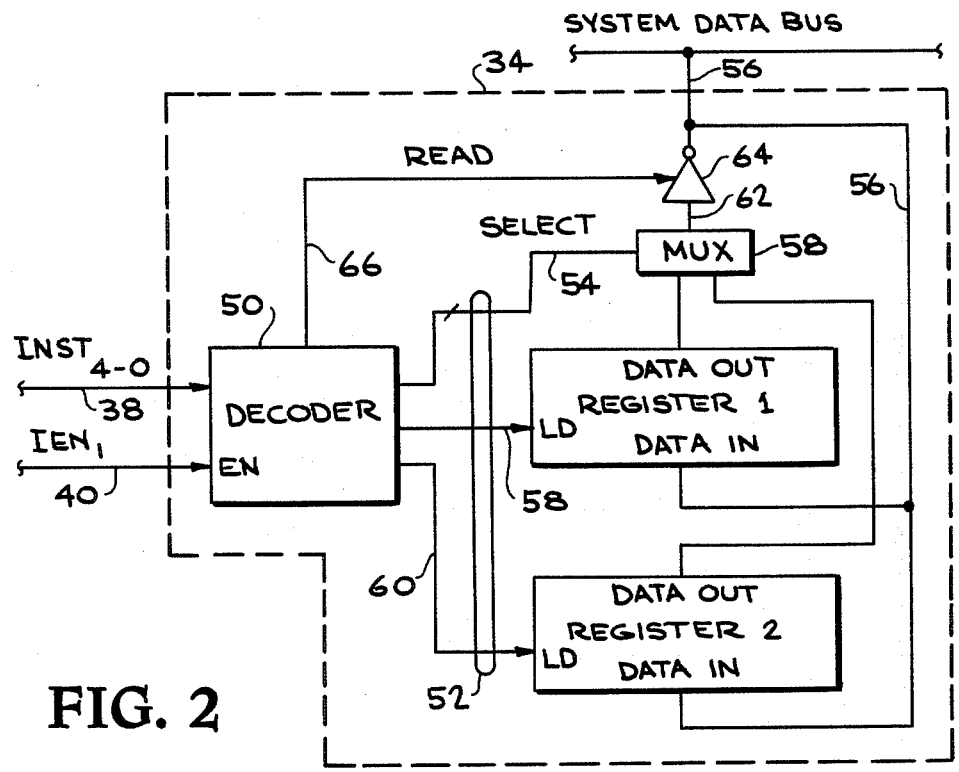
FIG. 2 is a logic diagram of the logic inside a typical peripheral used in the invention.

FIG. 2 shows the internal details of the typical peripheral and how the instruction enable selects the internal decoder and causes the decoder outputs to be activated to select the desired internal register or other logic of the peripheral which is to be read or written. FIG. 2 is shown as a typical internal detail for a peripheral such as peripheral 34. It is not intended to represent the exact internal detail of any particular peripheral or all peripherals in general. FIG. 2 is intended only to illustrate the use of the interface signals in a typical synchronous microprogrammed system for purposes of framing the context of the invention. Typical operation of a peripheral is as follows.

The instruction indicating which register inside the peripheral that is to be addressed arrives on the instruction bus 38 and is decoded by a decoder 50. This decoding happens only when the I EN*1 enable signal is active low. The decoder decodes the bits on the bus 38 and activates one of the control signals on the bus 52.

The bus 52 includes two different types of signals. There are a plurality of select signals on the bus 54 and individual load signals for each of a plurality of registers of which only two are shown. The shared system data bus 56 is coupled directly to all the data inputs of the registers and is coupled through a tri state gate and multiplexing system to all the data outputs of the registers. The individual load signals such as the signals on the lines 58 and 60 are coupled to the load control inputs of their respective registers. When any particular load signal is active, the associated register is loaded with whatever data is on the system data bus 56. All the other data inputs are high impedance and do not load the system bus 56.

The select signals on the SELECT signal bus 54 are coupled to the select inputs of a multiplexer 58. The multiplexer 58 has a data input coupled to the data output of each register. Each select input signal, when activated, causes the associated data input to be coupled to the single data output 62. This single data output 62 is coupled through a tri state gate 64 to the system data bus 56. The tri state gate 64 maintains its output coupled to the system data bus 56 in a high impedance state at all times when the READ signal on line 66 from the decoder 50 is not active. READ is activated by the decoder 50 when any of the signals on the select bus 54 are active.

FIG. 3 is a timing diagram of a typical read or write transaction to the peripheral 34 in FIG. 1. For simplicity, only the rising edges of the system clock are shown. At clock transition time t0, the instruction bus bits assume their states for either a read or write instruction. At the same time t0, the IEN*1 signal goes low which causes the decoder inside the peripheral to decode the instruction. Also, at time t0, or near that time, the data bus is driven with the data to be written to the peripheral. When the enable signal goes low, the proper register load input addressed by the instruction bus word is driven low and the data on the data bus is loaded into the register. In the case of a read instruction, the enable signal causes the decoder to decode the instruction and the proper select signal on the SELECT bus 54 is generated to cause the output of the proper register in the peripheral to be selected and applied to the data bus. Also, the enable signal cause the READ signal on line 66 to be activated so as to cause the tri state gate 64 to gate the selected output onto the system data bus 56. The data is then latched into a register in some peripheral or other unit connected to the system data bus which has been given an instruction to receive the data. This manner of peripheral information exchange is known in the prior art for microprogrammed systems.

Referring to FIG. 4 there is shown a typical microprocessor based system using a peripheral having a port for receiving address signals defining which internal register is to used in a read or write transaction. In the system of FIG. 4, the microprocessor 70 has a multiplexed address/data bus 72. In other embodiments, there may be separate address and data buses. FIG. 5 is a timing diagram of a typical data transaction between the microprocessor and the peripheral 74 having multiple internal registers. Joint reference to FIGS. 4 and 5 will be used to explain the typical operation of the system of FIG. 4.

Unlike the microprogrammed system of FIG. 1, the microprocessor and the peripheral in the system of FIG. 4 run on separate clocks. This means that a handshake must be used in the system of FIG. 4 to synchronize the proper transfer of data in contrast to the synchronous, single clock cycle operation of the system of FIG. 1. The details of this handshake or protocol are shown in FIG. 5. Assume that the microprocessor is to send a data word to one of the internal registers of the peripheral. The first step is to address the peripheral and tell it which of the internal registers is to receive the data. In the system of FIG. 4 one embodiment of how this is done is shown although there at least two other known ways of doing this in the prior art. Because the address and data bus are multiplexed, the bus 72 is first used to send the address of the peripheral and the particular register in that peripheral beginning at time t0. At time t1, an address latch enable signal ALE is activated. This signal is coupled to the load input of an address latch 76, and causes it to load the address on the bus 72. This address is coupled on a bus 80 to the inputs of a decoder 78 where it is decoded. The decoder activates a chip select signal CS* on a line 82 coupled to the chip select input of the peripheral 74. In the embodiment shown in FIG. 4, if the address on the bus 72 was the address of any of the multiple registers in the peripheral 74, the decoder would decode the most significant bits of the address and this fact would be detected. If this turned out to be the case, then the decoder 78 would activate the CS* signal, and the peripheral would be activated.

The peripheral must be informed which of its internal registers to load or which register is to drive its contents onto the data bus 72 at the appropriate time. There are at least three ways of doing this. One way is to do the transaction in two cycles. In the first cycle, the identification of the desired register is sent to the peripheral and stored. In the second cycle, the register identified in the first cycle is either loaded with the data word from the microprocessor or the identified register drives its contents onto the data bus 72. The second way is to cycle through the registers in the peripheral sequentially so that on the first transaction, the first internal register is used, and on the second transaction, the second internal register is used. This scheme requires use of a software or hardware counter to keep track of which register is currently active. In the embodiment of FIG. 4, the n least significant bits of the bus 80 are coupled to a port of the peripheral 74, and the bits on this bus 84 are decoded by the peripheral to determine which of the internal registers is to be accessed. The decoder 78 activates CS* if the address on the bus 80 is any one of the internal registers of the peripheral. The address latch 76 is needed only because the bus 72 is time division multiplexed with address and data information. If a separate address bus exists, the address latch 76 is not necessary.

The transaction ios completed as follows. When ALE is activated to latch the address at time t1, the microprocessor also activates an R/W* signal to the proper state to indicate whether the desired transaction is read or a write. FIG. 5 shows a write transaction, but a read transaction is similar. The address is then decoded, and chip select CS* goes low at time t2. The microprocessor then drives the data bus 72 with the data to be written as shown at time t3. Shortly thereafter, DS* is driven low by the microprocessor as shown at 90. The activation of data storbe causes the peripheral 74 to latch the data into the internal register indicated by the microprocessor either by the bit pattern on the bus 84 or by the register indicated by either of the other methods described above.

The latching of the data causes the READY* signal to be activated by the peripheral. This indicates to the microprocessor that the data has been received, so the microprocessor deactivates the data strobe signal DS* as shown at 92. This causes the READY* signal to be deactivated as shown at 94 and causes the microprocessor to remove the data from the data bus 72.

Because of the mixed nature of systems and peripherals that exist in the marketplace, a need has arisen for a processor peripheral interface which can serve both the synchronous and asynchronous markets for microprogrammed systems and microprocessor systems, respectively. Obviously, the pins and signals are different but there is some overlap in function which allows a naming convention to be adopted and a sharing of signals by a universal interface with the addition of a single signal which indicates to the interface whether it is to operate in the synchronous or asynchronous mode. The correspondence between the signals which are used in the interface according to the teachings of the invention is as follows.

| microprogrammed synchronous | microprocessor asynchronous |
| --- | --- |
| INSTO-N | =AO − AN (N LSBs on bus 84) |
| IEN* | =CS* |
| MSB of INST | =R/W* for N = 4, i.e., the R/W signal is INST bit 4 |
| DS* not needed | |
| READY not needed | |
| BMODE | |

The definitions of these signals for the interface of the invention is INSTO-N is the instruction bus. These bits are decoded with the peripheral to select the internal register or to perform certain functions. If the number of read and write instructions are equal, INST4 can become the equivalent of the R/W* pin and INSTO-3 can select the internal register. IEN* is the enable pin which lets the instruction be executed. It is equivalent to a chip select signal. The DS* signal from a microprocessor using the interface can be directly connected to the interface. In the case of microprogrammed system DS* can be connected to the IEN* line externally or permanently wired to a logic 0 level. READY* from the peripheral to the microprocessor that sends the date to signal that the transfer is complete becomes active when the data is properly strobed. It is not needed in synchronous systems. The BMODE signal, when high, indicates that the processor runs synchronously to the peripheral. When thsi signal is low, the processor runs asynchronously. A command register bit may be used in place of the pin.

Figure 6:
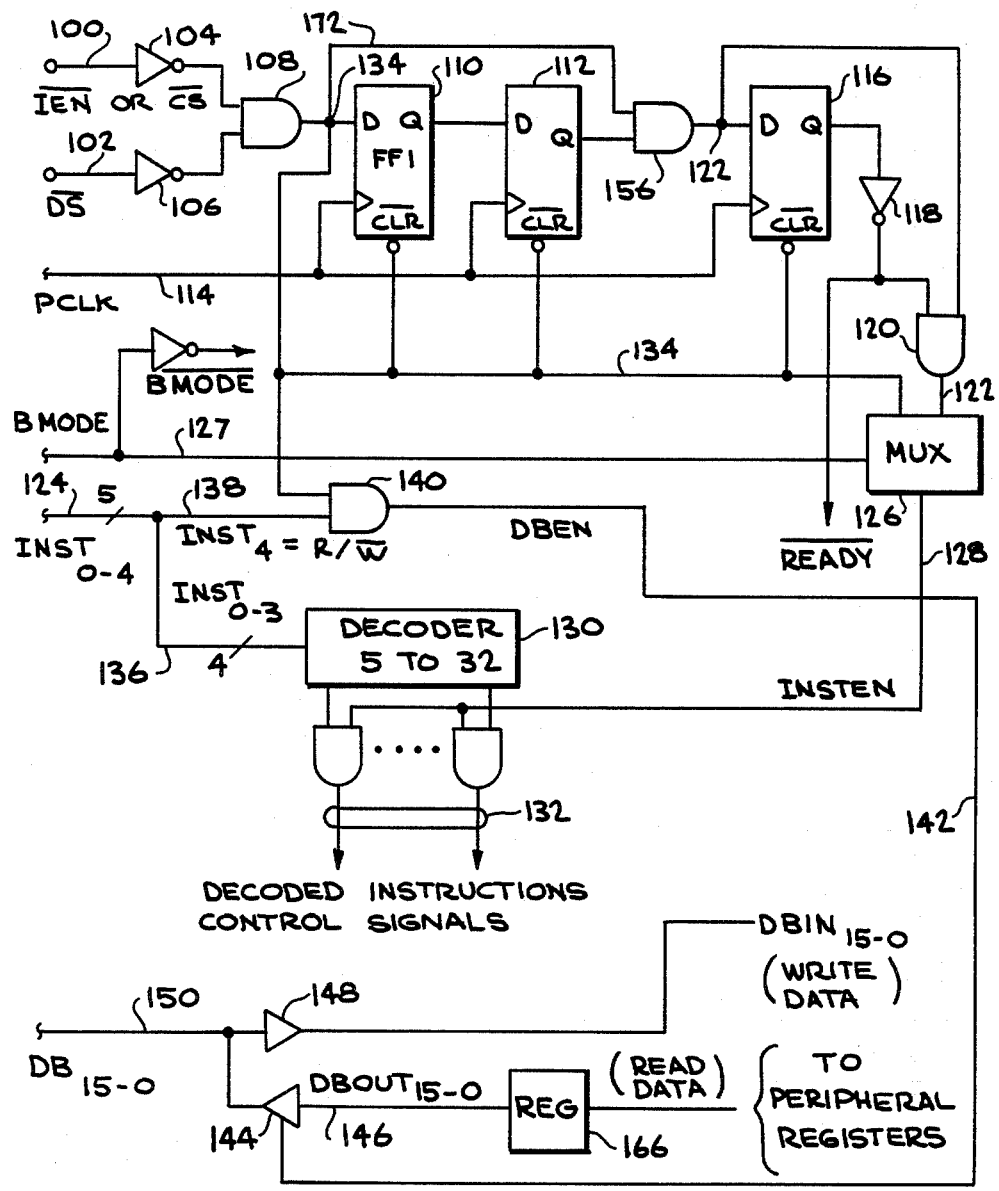
FIG. 6 is logic diagram of the universal interface according to the teachings of the invention.
Figure 7:
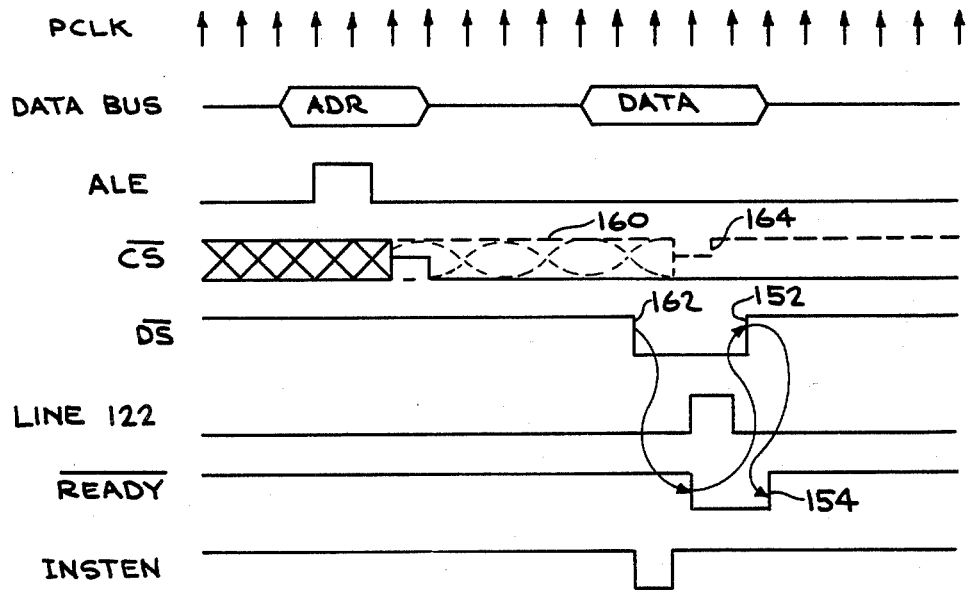
FIG. 7 is a timing diagram of a data exchange between a processor and a peripheral using the interface using the interface of FIG. 6.

FIG. 6 is a logis diagram of the logic of the peripheral interface of the invention which will allow a peripheral using the interface to do data exchange with either a synchronous or asynchronous processor. FIG. 7 is a timing diagram describing the operation of the interface fo FIG. 6. Referring jointly to FIGS. 6 and 7, the operation of the interface of FIG. 6 will be given.

The interface serves to perform a process of clock synchronization. The process starts when both the signals CS* and DS* on lines 100 and 102 become active low indicating that this particular peripheral is being addressed and that the data on the data bus in valid. The inverters 104 and 106 invert the signals,a nd the AND gate 108 signals the convergence by driving the D input of a first flip-flop 110 high. This event sets the Q output at the next upward transition of the PCLK signal on the line 114. The Q output of the flip-flop 110 is coupled to the D inputr of a second flip-flop 112 which reclocks the event to the next upward transition of the PCLK signal to avvoid metastable states.

The third flip-flop 116 combined with the inverter 118 and the AND gate 120 serve as a synchronous one shot that generates a pulse at the rising edge on the line 122. The pulse width is equal to the delay through the flip-flop plus the delay through the inverter 118 and the gate 120 plus any delay between the rising edge on the line 122 and the next rising edge of PCLK. The pulse output from the gate 120 on the line 122 serves as the IEN* signal for the peripheral enabling decoding of the instruction encoded on the INSTO-4 bus 124. Of course, the BMODE signal on line 126 must be high indicating peripheral is designed to work in a synchronous system. When the BMODE signal is high, the multiplexer 126 must select the signal on the line 122 for coupling to the line 128 as the signal INSTEN. This signal is coupled to one input of each of the AND gates gating the outputs of the decoder 130 which has decoded the instruction on the bus 124. Thus when INSTEN is high, the decoded instruction is sent out on the bus 132 to the circuitry in the peripheral which is to be controlled by the instruction. Thus a peripheral which is designed to work with a synchronous microprogrammed system which generates a signal IEN* may be made to work with an asynchronous microprocessor which does not generate IEN* but does generate a CS* and a DS* signal.

When the peripheral is designed to be coupled to an asynchronous microprocessor and is expecting a DS* and a CS* signal, the BMODE signal is low which causes the multiplexer 126 to select the signal on the line 134. Line 134 goes high when both CS* and DS* are active. When line 134 goes high and BMODE causes multiplexer 126 to select the line 134, then INSTEN goes high. This causes the instruction on the INSTO-3 bits on bus 136 to be decoded and passed through the AND gates at the output of the decoder 130 to the logic of the peripheral via the bus 132. This parallels normal asynchronous operation with the INSTO-3 bits substituting as the address bits on the bus 84 in FIG. 4. Of course the DS* and CS* signals serve their normal functions as gated and guided by the circuitry of FIG. 6.

Because a R/W*' signal is needed for asynchronous operation, the INST4 bit is used as this signal by breaking it out separately on the line 138. This signal is gated with the signal on line 134 in the AND gate 140 to generate the DBEN signal on the line 142. When the peripheral is selected and DS* is active this indicates that the data bus is being driven with data from the microprocessor or that the microprocessor is ready to receive data. The data bus will then be handled by the peripheral in accordance with the state of the the signal on the line 138. If the transaction is to be a read, the signal on the line 138 will be high as will the signal on the line 142. This will cause the data bus tri state driver 144 to drive the data bus lines DB15-0 with the data on the DBOUT15-0 lines of bus 146. If the transaction is to be a write, the bus receiver 148 will drive the data bus inside the peripheral, DBIN15-0, with the data on the data bus 150. The tri state bus driver 144 will be in a high impedance state thereby isolating the data outputs of the data registers in the peripheral from the data bus 150.

The READY* signal needed for asynchronous operation generated by the peripheral for transmission to the microprocessor indicating that the peripheral has received the data is generated by the peripheral interface from the output of the inverter 118. As seen from the timing diagram of FIG. 7, it is seen that when the DS* signal goes low, the READY* signal goes low after some propagation delays. When the READY* signal is received by the microprocessor, the DS* signal is deactivated by the microprocessor as shown in FIG. 7 at 152. This causes the READY* signal to again go high at 154 after the change in DS* to a logic 1 causes the signal on line 134 to go low thereby clearing all the flip-flops in FIG. 6.

The gate 156 serves to prevent an anomaly in decoding the chip select signal from causing the wrong peripheral to clock in data not intended for it. Sometimes the decoder outside the peripheral which decodes the chip select signal CS* (not shown) from the address bus is slow enough in decoding the CS* signal that the ultimate result does not occur until after the DS* signal goes low. This condition is shown in dotted lines in FIG. 7 as the interval 160. During this interval, the chip select signal CS* may be going up and down as the decoder works its way through to the ultimate outcome. It is possible that the DS* signal will go low at 162 at a time when the CS* signal is low. It is also possible that the ultimate outcome of the decoding of the address will be as shown at 164 and the address is not that of the peripheral. If this occurs, then data will be clocked into the peripheral that is not intended for it. To prevent this from occurring, the gate 156 is used. The purpose of this gate is to block clocking of the signal on the line 134 through the two flip-flops 110 and 112 into the flip-flop 116 unless the condition of the signal on the line 134 still persists two clock cycles later. That is, if CS* and DS* both go low, the signal on the line 134 will go high. This logic 1 will be clocked into flip-flop 110 on the next clock pulse, and will be clocked into the flip-flop 112 on the second successive clock cycle. However, the AND gate 156 will prevent the clocking of the signal at the output of the flip-flop 112 into the flip-flop 116 unless the signal on the line 172 is still logic 1 on the third successive clock pulse after the transition 162 in FIG. 7.

FIG. 7 illustrates the relative time durations of the INSTEN signal and the DS* signal. The figure shows that INSTEN is much shorter than DS*. This indicates that the microprocessor is expecting the data being driven on the data bus by the peripheral to be valid much longer than the INSTEN signal will enable the register driving the data bus. To insure that the data being read by the microprocessor is still there when the microprocessor is ready to read it, a pipeline register or storage register 166 is provided in the read path. This register is always enabled and latches the data driven on the bus 146 when INSTEN enables the register being addressed. The data is then preserved and is still present on the data bus 146 for driving onto the main data bus 150 even after INSTEN goes inactive.

Figure 9:
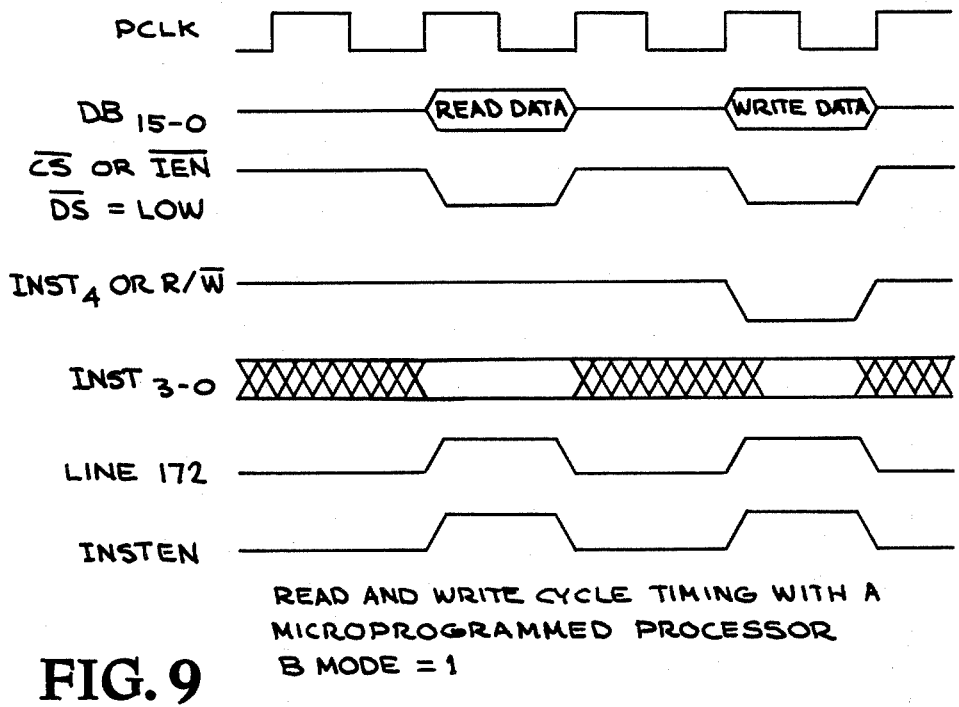
FIG. 9 is a timing diagram for read and write transactions with a synchronized processor.

Referring to FIG. 8 there is shown a timing diagram of a write cycle for an asynchronous processor when BMODE is low. Note that even though the system clock driving the microprocessor is about ½ the speed of the peripheral clock signal PCLK, a read cycle can occur because of the connection of the line 142 and the action of the pipeline register. That is, the pipeline register latches the data which is driven onto bus 146 by the addressed register (not shown). This is true even though the register is enabled by INSTEN for only the single cycle of PCLK that INSTEN is true. Meanwhile, the DS* signal keeps the bus 146 connected to the bus 150 for the entire time the microprocessor is expecting the data to be valid, i.e., during the entire time the DS* signal is active. The latter fact is true because both CS* and DS* are low during the entire read data period, so line 134/172 is high for the entire read data period. If INST4 is high during the entire read data period, as it is normally, then gate 140 will drive the bus driver 144 to a non tri state condition through line 142 during the entire read data period. FIGS. 8 and 9 clearly show that the interface shown in FIG. 6 can be used to for read or write cycles with either synchronous or asynchronous systems. Note the sequencing of the READY signal with DS* in FIG. 8 and the correspondence of the timing with the timing shown in FIG. 5.

Figure 10:
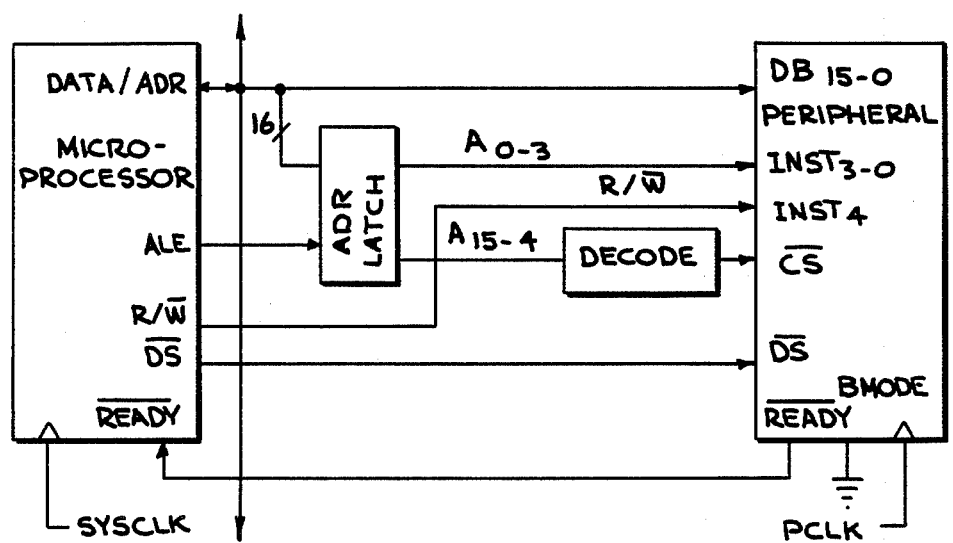
FIG. 10 is a connection diagram for connection of the interface to an asynchronous processor.
Figure 11:
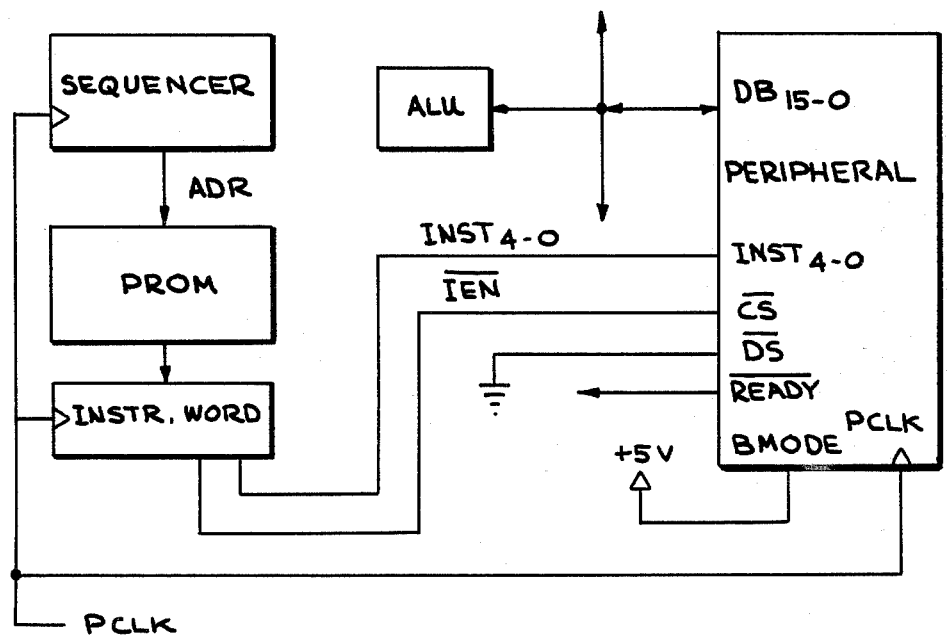
FIG. 11 is a connection diagram for connection of the interface to a synchronous processor.

FIGS. 10 and 11 show how a peripheral with the interface shown in FIG. 6 could be attached to an asynchronous microprocessor system and a synchronous microprogrammed system. The various connections of the BMODE, clock and DS* signals for the two different configurations are shown in these figures for the necessary voltage conditions necessary for the interface to work in the two different configurations.

Although the invention has been disclosed in terms of the preferred embodiment disclosed herein, those skilled in the art will appreciate various modifications which could be made without departing from the spirit and scope of the invention. All such modifications are intended to be included within the scope of the claims appended hereto.

We claim:

1. An interface to allow a peripheral device to communicate with either synchronous or asynchronous systems comprising:
    means for ANDing and synchronizing a data strobe and a chip select signal from an asynchronous system and converting the combined signal into an instruction enable signal when a BMODE signal is in a first state;
    first means for gating an instruction enable signal from a synchronous system through as the peripheral's internal instruction enable signal when said BMODE signal is in a second state; and
    second means for gating one signal on an instruction bus from either a synchronous or an asynchronous system with said combined data strobe and chip select signals as the peripheral's read/write signal.

2. The apparatus of claim 1 wherein said means for ANDing and synchronizing is comprised of
    an AND gate having a first input coupled through an inverter to receive said chip select signal and having a second input coupled through an inverter to receive said data strobe signal and having an output;
    synchronizing means coupled to the output of said AND gate for synchronizing the combined signal with a clock signal and having an output;
    third means coupled to the output of said synchronizing means for converting the synchronized version of the combined chip select and data strobe signals into a pulse;
    fourth means coupled to receive said pulse and gate it through for use as the peripheral's instruction enable signal when said BMODE signal is in said first state.

3. The apparatus of claim 2 wherein said fourth means is comprised of a multiplexer having a first input coupled to receive said pulse and having a second input coupled to the output of said AND gate and having its select input coupled to said BMODE signal and having an output for providing the signal coupled to a selected one of said first and second inputs as said instruction enable signal for said peripheral.

4. The apparatus as defined in claim 2 wherein said synchronizing means is comprised of a first D type flip-flop having a D input coupled to said output of said AND gate and having a clock input coupled to said clock signal and having a Q output, and a second D type flip-flop having a D input coupled to said output of said first flip-flop and having a clock input coupled to clock signal and having a Q output, and a second AND gate having first and second inputs said Q output of said second flip-flop being coupled to said first input of said second AND gate and said second input of said second AND gate being coupled to an output of said AND gate and where both said first and second flip-flops have clear inputs coupled to the output of said AND gate.

5. The apparatus of claim 4 wherein said third means is comprised of a third D type flip-flop having a D input coupled to the output of said second AND gate and having a clock input coupled to receive said clock signal and having a clear input coupled to the output of said AND gate and having a Q output, and a third AND gate having a first input coupled to the Q output of said third flip-flop and having its second input coupled to the D input of said flip-flop.

6. The apparatus as defined in claim 5 wherein said fourth means is a multiplexer having its first input coupled to said Q output of said third flip-flop and having a second input coupled to the output of said AND gate and having a select input coupled to receive said BMODE signal.

7. An interface between a peripheral and a system comprising:
    means for, alternatively, either combining and synchronizing a data strobe signal and a chip select signal to a peripheral clock to form a first control signal and for gating said first control signal with a second control signal to form a first instruction enable signal, or for gating a second instruction enable signal from a synchronous system running on said peripheral clock with a control signal to form said first instruction enable signal; and
    means for ANDing a signal on an instruction bus with said first control signal to form a third control signal and for using said third control signal signal as a read/write control signal to control access by said peripheral to a data bus used by the peripheral to communicate with said system.

8. An interface between a peripheral and a system comprising:
    means for inverting a chip select signal and a data strobe signal and for ANDing the inverted signals to form a combined signal at a first output;
    means coupled to said first output for synchronizing the combined signal to a peripheral clock signal to form a synchronized signal and for reducing the possibility that metastable states will occur and for presenting said synchronized signal at a second output;
    means coupled to said second output for converting said synchronized signal to an instruction enable signal and for presenting said instruction enable signal at a third output;
    multiplexer means having a first input coupled to said third output and having a second input coupled to said first output and having a select input for receiving a control signal which has at least two states indicating whether the peripheral is coupled to a synchronous or an asynchronous system and having an instruction enable output at which appears said instruction enable signal representing the signal at either said first input or said second input of said multiplexer means depending upon the state of said control signal;
    an instruction bus input; and
    means for ANDing a signal from said instruction bus input of said peripheral with the signal at said first input of said multiplexer to form a second control signal and for using said second signal as a read write signal.

* * * * *